(12) United States Patent
Lee et al.

(10) Patent No.: US 8,155,233 B1
(45) Date of Patent: Apr. 10, 2012

(54) MIMO DECODING IN THE PRESENCE OF VARIOUS INTERFERING SOURCES

(75) Inventors: Jungwon Lee, Cupertino, CA (US); Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 777 days.

(21) Appl. No.: 12/207,350

(22) Filed: Sep. 9, 2008

Related U.S. Application Data

(60) Provisional application No. 60/971,324, filed on Sep. 11, 2007.

(51) Int. Cl.
*H04B 7/02* (2006.01)
*H04L 1/02* (2006.01)

(52) U.S. Cl. ...................................................... 375/267

(58) Field of Classification Search .................. 375/260, 375/267, 299, 346, 347, 348, 350; 370/260, 370/208, 210, 231, 328, 337; 455/69, 70, 455/296, 500
See application file for complete search history.

(56) References Cited

U.S. PATENT DOCUMENTS

| | | | |
|---|---|---|---|
| 2002/0150187 A1* | 10/2002 | Chugg et al. | 375/348 |
| 2005/0025039 A1* | 2/2005 | Hwang et al. | 370/206 |
| 2005/0101259 A1* | 5/2005 | Tong et al. | 455/69 |
| 2005/0286462 A1* | 12/2005 | Roh et al. | 370/328 |
| 2006/0269023 A1* | 11/2006 | Chimitt et al. | 375/350 |
| 2007/0135125 A1* | 6/2007 | Kim et al. | 455/436 |
| 2007/0165737 A1 | 7/2007 | Sarrigeorgidis | |
| 2007/0211813 A1* | 9/2007 | Talwar et al. | 375/267 |
| 2007/0230608 A1* | 10/2007 | Li | 375/267 |
| 2008/0025442 A1* | 1/2008 | Hwang et al. | 375/346 |
| 2008/0239938 A1* | 10/2008 | Jalloul et al. | 370/201 |

FOREIGN PATENT DOCUMENTS

WO WO-2006/056836 6/2008

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANS, TGn Sync Proposal Technical Specification," doc.: IEEE 802.11-04/0889r6, May 2005.

IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," *The Institute of Electrical and Electronics Engineers, Inc.*, Apr. 1, 2003.

(Continued)

*Primary Examiner* — David C. Payne
*Assistant Examiner* — Syed Haider

(57) ABSTRACT

A method of decoding a signal transmitted via a multiple input multiple output (MIMO) communication channel includes obtaining a first set of parameters associated with a first plurality of transmitters transmitting a plurality of intended streams, obtaining a second set of parameters associated with an interference source, receiving a plurality of streams including the plurality of intended streams; and decoding the plurality of intended streams using the first set of parameters and the second set of parameters.

35 Claims, 9 Drawing Sheets

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

Zheng et al., "Link Performance Abstraction for ML Receivers based on RBIR Metrics", IEEE 802.16 Broadband Wireless Access Working Group, Sep. 10, 2007.

U.S. Appl. No. 12/119,264, entitled "BICM Decoding in the Presence of Co-Channel Interference", filed May 12, 2008.

U.S. Appl. No. 12/171,790, entitled "Co-Channel Interference Cancellation with Multiple Receive Antennas for BICM", filed Jul. 11, 2008.

IEEE Std 802.16/2004 (Revision of IEEE Std 802.16/2001), "IEEE Standard for Local and metropolitan area networks; Part 16: Air Interface for Fixed Broadband Wireless Access Systems," *The Institute of Electrical and Electronics Engineers, Inc.*, Oct. 1, 2004; 893 pages.

\* cited by examiner

MIMO DECODING IN THE PRESENCE OF VARIOUS INTERFERING SOURCES

CROSS REFERENCE TO RELATED APPLICATION

This application claims the benefit of U.S. Provisional Patent App. No. 60/971,324 entitled "MIMO Decoding in the Presence of Various Interfering Sources," filed Sep. 11, 2007, the disclosure of which is hereby expressly incorporated herein by reference.

FIELD OF TECHNOLOGY

The present disclosure relates generally to Multiple-Input-Multiple-Output (MIMO) Systems and, more particularly, to decoding signals in a MIMO system in the presence of interfering sources.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Multiplexing (OFDM) encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16 IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16 IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the 802.11n IEEE Standard now being adopted. Further, the 802.16 standard, or WiMAX, applies to cell-based systems and supports MIMO techniques. Generally speaking, the use of MIMO technology produces significant increases in spectral efficiency and link reliability of 802.xx and other systems, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

The transmitters and receivers in the wireless communication system may each be capable of using a variety of modulation schemes. For example, some modulations schemes may provide a higher bit rate than other schemes (e.g., 64-QAM vs. 16-QAM). Typically, modulation schemes that provide a higher bit rate may be more sensitive to channel impairments as compared to modulation schemes with a lower bit rate.

Thus, certain modern wireless communications occur over a number of channels in which multiple transmitters simultaneously transmit to multiple receivers. As is known, several factors affect the spectral efficiency of a wireless communication system, i.e., the ability of the system to optimally use the band of available frequencies. In one aspect, inter-symbol interference (ISI) arises when a signal from a transmitting antenna is reflected off various obstacles, thereby creating a multi-path propagation channel between the transmitting antenna and the intended receiver. Because multiple copies of a transmitted symbol may arrive at the receiving antenna with different propagation delays, the received signal may have blurry boundaries between sequentially transmitted symbols.

In another aspect, systems such as WiMAX include base stations defining areas of coverage, or cells, in which users (e.g., mobile stations, portable or stationary devices, etc.) communicate through the cellular network including the base stations. More specifically, base stations have one or several antennas to which users transmit "uplink" data and from which users receive "downlink" data. In these systems, proximate transmitters operating on the same carrier frequency create inter-channel interference (ICI), further reducing the quality and reliability of reception. As a result, cellular-type wireless systems in general, and those that utilize MIMO modulation in particular, typically do not use the same frequency in adjacent cells. For example, as illustrated in FIG. 1, a wireless system 10 in which the equally sized cells 12 cover the entire geographic area, has a frequency reuse of ⅓ because each of the frequencies 20-26 can be used in at most ⅓ of total number of cells 12. As a result, the efficiency of the wireless system 10 is significantly limited.

SUMMARY

In one embodiment, a method of decoding a signal transmitted via a multiple input multiple output (MIMO) communication channel includes obtaining a first set of parameters associated with a first plurality of transmitters transmitting a plurality of intended streams, obtaining a second set of parameters associated with an interference source, receiving a plurality of streams including the plurality of intended streams, and decoding the plurality of intended streams using the first set of parameters and on the second set of parameters.

In another embodiment, a smart receiver for decoding a signal transmitted via a multiple input multiple output (MIMO) communication channel includes a plurality of antennas which receive a plurality of streams including a set of intended streams and a set of interference streams via the MIMO channel, a demodulator that demodulates the plurality of streams based on at least first channel data associated with the set of intended streams and second channel data associated with the set of interference streams, a deinterleaver that receives the demodulated plurality of streams and restores a sequence of symbols, and a decoder that decodes the restored sequence of symbols.

In another embodiment, a method of decoding, at a first wireless device, a signal including a plurality of streams from a second wireless device communicating in a MIMO mode with the first wireless device includes receiving a first channel description associated with a first cell in which the first wireless device and the second wireless device operate, receiving a second channel description associated with a second cell, constructing a channel model using the first channel description and on the second channel description, receiving the signal, and decoding the signal according to the constructed channel model.

DETAILED DESCRIPTION

Figure 2:
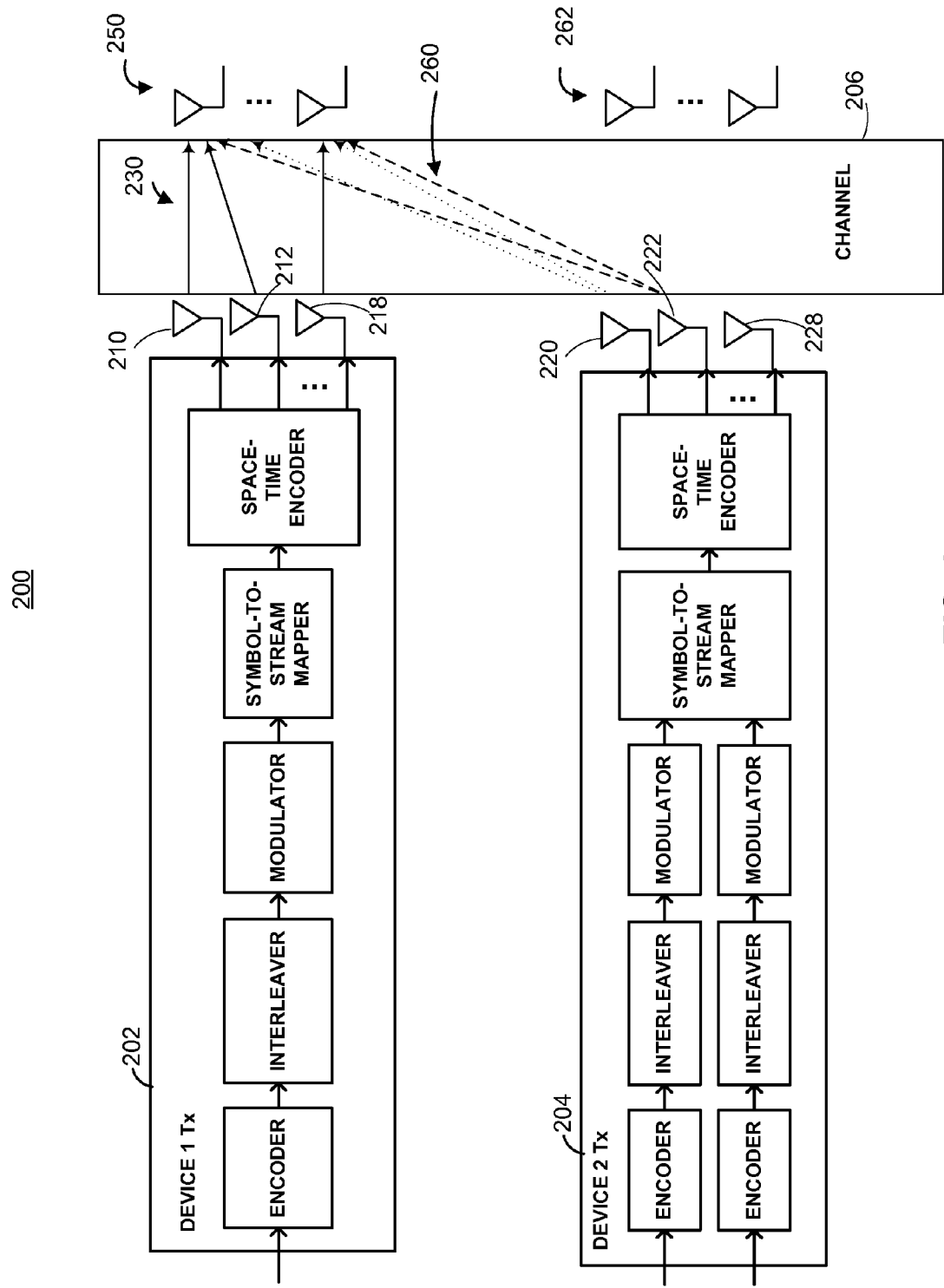
FIG. 2 is a block diagram illustrating co-channel interference in a MIMO system.

FIG. 2 is a block diagram illustrating an example MIMO wireless communication system 200 in which multiple transmitters, such as a device 202 and a device 204, simultaneously transmit over a shared wireless communication channel 206. Each of the devices 202 and 204 may be a base station or a mobile station equipped with a set of antennas 210-218 and 220-228, respectively. Of course, the wireless communication system 200 may include any number of devices, each equipped with the same or a different number of antennas. The number of antennas of each device may be any suitable number such as 1, 2, 3, 4, . . . . Thus, some devices may be equipped with only a single antenna.

In one operational state, the antennas 210-218 may operate as transmitters to transmit several intended streams of information 230 to one or more antennas 250. More specifically, the antennas 210-218 may operate in any of the MIMO modes or schemes, including those known in the art. For example, the device 202 may use the antennas 210-218 to improve channel diversity by transmitting multiple copies of the same symbol via several streams. Alternatively, the device 202 may transmit different symbols via each of the antennas 210-218 to increase throughput. As yet another alternative, the device 202 may operate in a mixed MIMO mode to improve both channel diversity and throughput.

In another operational state, the antennas 210-218 may operate as receivers and may listen to incoming traffic from the one or more antennas 250. Thus, in this state, the antennas 210-218 may be receivers and the antennas 250 may be transmitters. It will be noted, however, that the antennas 210-218 or 220-228 need not operate in multiple (e.g., receive, transmit, etc.) states in at least some of the applications. In application to high-definition television, for example, the antennas 210-218 may operate solely as receivers. On the other hand, if the device 202 is a mobile station in a WiMAX communication network, the antennas 210-218 may support both uplink and downlink transmissions. Additionally, there may be separate transmit antennas and separate receive antennas.

Figure 1:
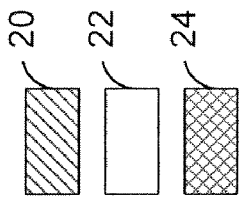
FIG. 1 schematically illustrates a cellular wireless system having a frequency reuse of ⅓.
Figure 1:
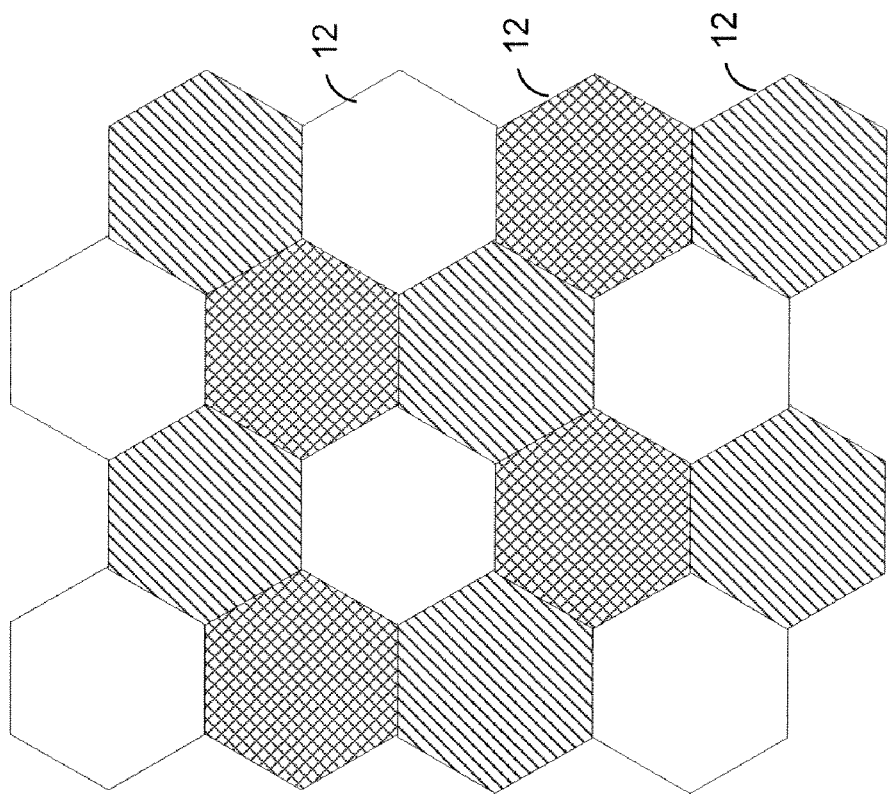

In addition to the intended streams 230 from the antennas 210-218, the antennas 250 operating in a receive mode may pick up interference streams 260 directed from the antennas 220-228 to the antennas 262 if the streams 230 and 260 share the carrier frequency or a band of carrier frequencies. Similarly, the antennas 262 may pick up the streams 230 from the antennas 250 as interference (with respect to the streams 260 intended for the antennas 262). As discussed above with reference to FIG. 1, the devices 202 and 204 operating in the existing communication systems do not transmit at the same frequency at the same time unless the devices 202 and 204 are sufficiently far apart for the amplitudes of the mutually interfering streams 230 and 260 to have substantially faded at the respective non-intended receivers, i.e., the antennas 250 and 262. If, for the example, the devices 202 and 204 are base stations defining respective cells in a WiMAX network, these cells typically cannot be adjacent to each other and, accordingly, the frequency reuse is not equal to one. As an equally undesirable alternative, the devices 202 and 204 may operate in the same frequency band in the adjacent or proximate cells but the throughput to the respective receivers may be relatively low due to the resulting high inter-channel interference.

It will be further noted that the antennas 210-218, for example, may define different numbers of streams 230 in various embodiments or configurations of the device 202. Typically, the number of spatial streams associated with a shared communication channel (such as the channel 206) is less than or equal to the number of transmit antennas. Further, each stream may correspond to a separate encoder chain (e.g., an encoder, an interleaver, a modulator) or, alternatively, a shared encoder chain may operate on multiple streams. For example, the device 202 in FIG. 2 includes an encoder, an interleaver, and a modulator servicing several streams 230, whereas the device 204 includes two encoder chains, each directing one or several respective streams to a shared symbol-to-stream mapper. WiMAX standards, to take another example, currently support both a single-encoder option and a two-encoder option for a two-transmit-antenna configuration. In general, the number of encoders and/or encoder chains may be less than or equal to the number of transmitted streams.

Thus, as illustrated in FIG. 2, the wireless communication channel 206 may include the intended channel defined by the intended streams 230, an interfering channel defined by the interfering streams 260 and, in some cases, one or several additional interfering channels, each having one or more interfering streams. For the purposes of convenience, the term "channel" is used herein to refer to the combined channel including both the intended and at least the highly relevant interfering sources. More precisely, the mathematical models discussed below use the term "channel" to refer to a set of parameters defining such combined channel.

Figure 3:
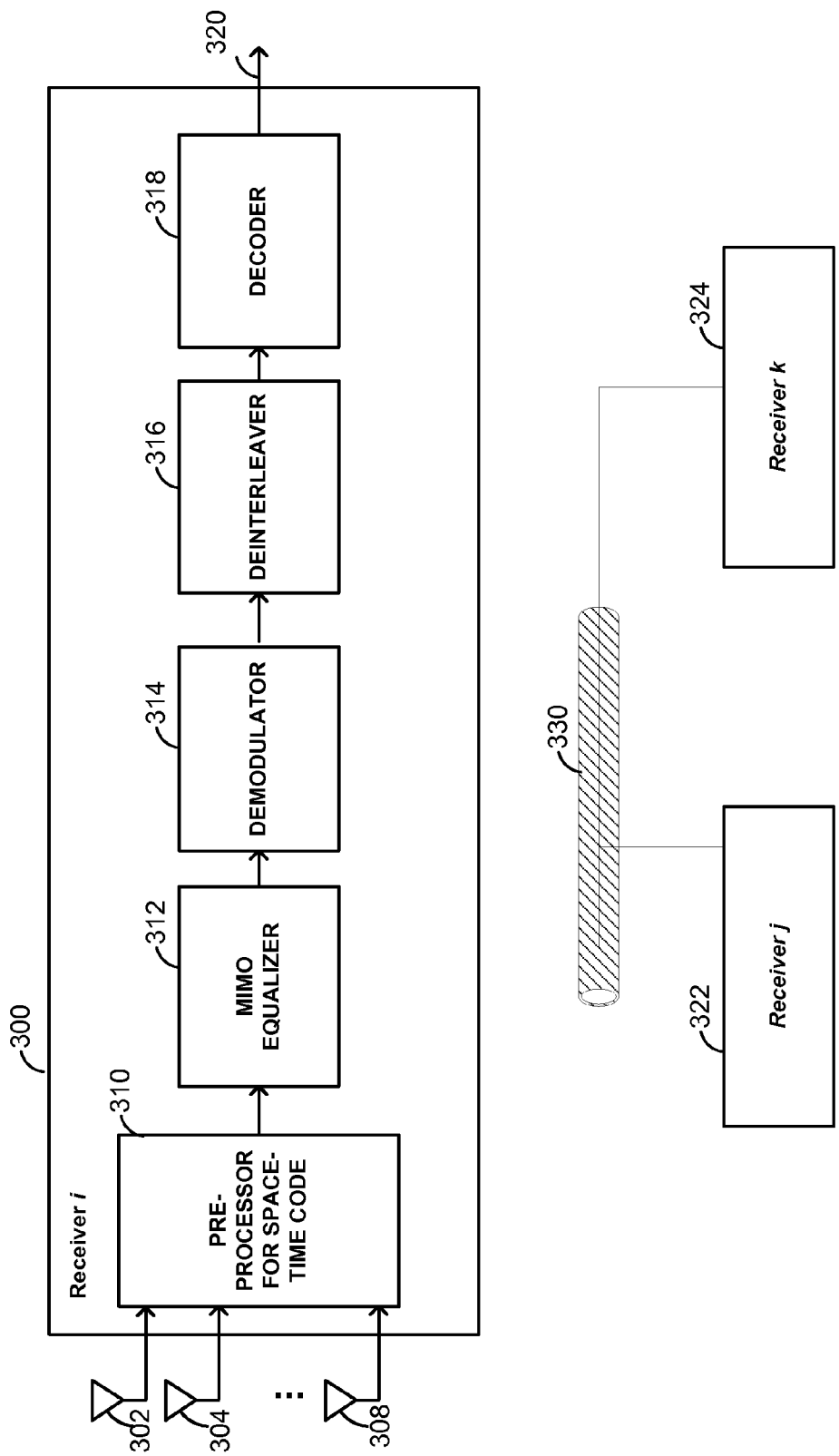
FIG. 3 is a block diagram of a receiver capable of MIMO decoding in the presence of various interference sources.

Referring to FIG. 3, a receiver 300 equipped with antennas 302-308 may receive and properly decode information from one or more intended transmitters operating in a shared wireless communication channel in the presence of various interfering sources such as, for example, interfering transmitters operating in the same carrier frequency band in an adjacent cell, or otherwise in close proximity to the intended transmitters. Receivers such as the receiver 300 may be referred to as "smart receivers." Because the smart receiver 300 can estimate the channel associated with the interfering transmitters and separate the interference streams from the intended streams, the smart receiver 300 does not require that other transmitters using the same frequency band operate in non-adjacent cells to maintain high throughput. The architecture and operation of the smart receiver 300 is discussed below with reference to FIG. 3, and the application of the smart receiver 300 to some of the known MIMO modes is further discussed with reference to FIG. 3 and to the example flow diagrams illustrated in FIGS. 4-8.

In operation, the smart receiver 300 may obtain information regarding the one or more interfering channels in a wired or wireless manner. For example, the smart receiver 300 may be a base station (or a module in a base station) communicatively coupled to a base station 322 and to a base station 324 via a wired network backbone 330. The base stations 300, 322 and 324 may each support multiple mobile stations communicating, for example, according to an OFDMA scheme configured optionally to use the same frequency band. By using any suitable network protocol, the base stations 300, 322, and 324 may exchange such information as modulation schemes, MIMO mode, etc. and, based on the received information, estimate a set of parameters to generate a channel model discussed in more detail below. To continue with this example, the mobile stations operating in the cells supported by the base stations 322 and 324 may be significant sources of interference for the base station 300 during receiving and decoding of the intended streams from one or more mobile stations operating in the cell supported by the base station 300. Of course, if the base stations 300, 322, and 324 do not switch between the transmit and receive modes in a synchronized manner, the signals from the base stations 322 and 324 may create additional interference for the base station 300.

Additionally or alternatively, the smart receiver 300 may estimate channel information due to the interfering mobile stations in the adjacent cell by processing substantially unique pseudo-noise (PN) sequences from the neighbor base stations or from the mobile stations communicating with these base stations. As yet another alternative, the base station equipped with the smart receiver 300 may store at least some of the information necessary for estimating the interfering channel as part of base station configuration data. Thus, based on the information received via the wired backbone, the wireless network, or both, the smart receiver 300 operating as a base station may estimate the uplink channel as a set of both the intended streams and the interfering streams.

On the other hand, the smart receiver 300 operating as a mobile station (or as a module in a mobile station) may estimate the downlink channel, including both the parameters related to the intended streams and to the interfering streams, based on wireless signals only. As one example, a mobile station operating in a WiMAX network may estimate the portion of the channel related to the interfering sources from a Downlink Map (DL-MAP) message broadcast by the adjacent base stations using the same carrier frequency as the frequency on which the mobile station receives the one or more intended streams. As is known, the DL-MAP message specifies the allocation of resources (i.e., carrier frequencies, timeslots, etc.) in the OFDMA scheme. Thus, by processing DL-MAP messages from one or several adjacent base stations in addition to the base station with which the mobile station is currently communicating, the mobile station can obtain a set of parameters that may be used for constructing the channel model discussed below. Further, a mobile station may obtain these or additional channel parameters from the periodic broadcasts of PN sequences, similarly to processing of PN sequences at a base station discussed above.

Upon collecting the information necessary for quantifying the effect of co-channel interference, the smart receiver 300 operating in a base station or in a mobile station may separate the intended streams from the interfering streams by utilizing a model such as:

$$y = Hx + z, \text{ where}$$

$$y = \begin{bmatrix} y_1 \\ y_2 \\ \vdots \\ y_{N_R} \end{bmatrix} \quad H = \begin{bmatrix} h_{1,1} & h_{1,2} & \cdots & h_{1,N_{TS}} \\ h_{2,1} & h_{2,2} & \cdots & h_{2,N_{TS}} \\ \vdots & \vdots & \vdots & \vdots \\ h_{N_R,1} & h_{N_R,2} & \cdots & h_{N_R,N_{TS}} \end{bmatrix} \quad x = \begin{bmatrix} x_1 \\ x_2 \\ \vdots \\ x_{N_{TS}} \end{bmatrix}$$

$$z = \begin{bmatrix} z_1 \\ z_2 \\ \vdots \\ z_{N_R} \end{bmatrix},$$

in which y represents, in vector from, the receive signal, H represents the MIMO communication channel, x represents the transmit signal, and z represents the noise vector. More precisely, $y_r$ is a receive signal at antenna r and $z_r$ is noise at an antenna r. Accordingly, the number of receive antennas included in the model illustrated above is $N_R$. Meanwhile, according to this model, a transmit stream $x_s$ is an intended stream if $1 \leq s \leq N_S$ or an interference stream if $N_{S+1} \leq s \leq N_{TS}$. Thus, the model accounts for the total of $N_{TS}$ streams in the MIMO channel. Of course, the model may be applied to a single interference source in the transmit signal vector x or several interference sources such as multiple adjacent base stations each equipped with several antennas, for example.

The MIMO communication channel H includes channel gain parameters $h_{r,s}$ representing channel gain in a stream s at a receive antenna r. In at least some of the embodiments, each channel gain $h_{r,s}$ is a complex number that incorporates an amplitude factor and a phase shift factor. In other words, each $h_{r,s}$ parameter may represent an attenuation coefficient associated with a certain propagation path as used in, for example, a Rayleigh fading channel model. In general, the model y=Hx+z may represent any MIMO mode such as space-time encoding, spatial multiplexing, beam forming, etc. The smart receiver 300 may estimate the parameters $h_{r,s}$ by collecting information from the adjacent transmitters/receivers in a wired and/or wireless manner, as discussed above.

With continued reference to FIG. 3, the smart receiver 300 may decode the received signals in accordance with the model discussed above. In particular, in order to separate the intended signals from the interference signals, the receiver 300 may pre-process the signals from the antennas 302-308 in a pre-processor for space-time code 310, optionally equalize the received signals in a MIMO equalizer 312, demodulate the received signals in a demodulator 314, process the demodulated signals in a deinterleaver 316 if necessary, and finally decode the signals in a decoder 318 to generate information symbols 320. Depending on the amount of noise and on quality of the MIMO channel, the fully decoded information bits 320 may arrive at a high data rate with a low error rate.

The components or modules 310-318 may be implemented as hardware, software, firmware, or mixed components. For example, some or all of the components may be custom integrated circuits, application-specific integration circuits (ASICs), etc., communicatively coupled by electrical busses. In this case, the smart receiver 300 optionally may include bypass busses (not shown) to bypass some of the components if the currently active MIMO mode does not require certain operations, such as processing multiple presentations of a symbol encoded according to a space-time encoding scheme. Alternatively, some or all of the modules 310-318 may be software modules, stored in a computer-readable memory and executed on a processor. Other implementations of the modules 310-318 are also possible such as using a combination of hardware, software, and/or firmware.

As indicated above, the smart receiver 300 in some embodiments or in some modes of operation may not use include one or more of the modules 310-318 or, alternatively, may not use each of the modules 310-318 in decoding the received signals. For example, the smart receiver 300 may not use the pre-processor for space-time code 310 if neither the intended streams nor the interfering streams are space-time encoded. In some embodiments, the smart receiver 300 may quickly switch between several modes of decoding (e.g., spatial multiplexing to beamforming) in response to changes in network conditions, such as due to the smart receiver 300 moving into a different geographical area in which users rely on a different MIMO mode. Thus, the data received by the antennas 302-308 may bypass at least some of the modules 310-318 depending on the MIMO mode, user preferences, computational cost, etc. Further, it will be appreciated that some of the modules 310-318 may be combined or, conversely, divided into smaller components.

As one example particularly relevant to decoding of non-space-time-encoded signals, the smart receiver 300 may direct data received by the antennas 302-308 to the MIMO equalization module 312. In general, the MIMO equalization module 312 may implement any suitable MIMO equalization techniques, including those known in the art. For example, the MIMO equalization module 312 may operate as a zero-forcing (ZF) linear equalizer (LE), a minimum mean square error liner equalizer (MMSE LE), a ZF decision feedback equalizer (DFE), an MMSE DFE, etc. As a more specific example, the MIMO equalization module 312 may apply the ZF approach to a channel in which the number of receive antennas ($N_r$) is two, the number of intended streams ($N_S$) is two, and the total number of streams ($N_{TS}$) is four. Accordingly, rather than operating with the original model $$y = Hx + z,$$

$$\begin{bmatrix} y_1 \\ y_2 \end{bmatrix} = \begin{bmatrix} h_{1,1} & h_{1,2} & h_{1,3} & h_{1,4} \\ h_{2,1} & h_{2,2} & h_{2,3} & h_{2,4} \end{bmatrix} \begin{bmatrix} x_1 \\ x_2 \\ x_3 \\ x_4 \end{bmatrix} + \begin{bmatrix} z_1 \\ z_2 \end{bmatrix}$$

the smart receiver 300 may work with an equalized model $$\tilde{y} = \tilde{H}x + \tilde{z}$$

$$\begin{bmatrix} \tilde{y}_1 \\ \tilde{y}_2 \end{bmatrix} = \begin{bmatrix} 1 & 0 & \tilde{h}_{1,3} & \tilde{h}_{1,4} \\ 0 & 1 & \tilde{h}_{2,3} & \tilde{h}_{2,4} \end{bmatrix} \begin{bmatrix} x_1 \\ x_2 \\ x_3 \\ x_4 \end{bmatrix} + \begin{bmatrix} \tilde{z}_1 \\ \tilde{z}_2 \end{bmatrix}.$$

It is apparent that the equalized channel matrix $\tilde{H}$ forces $x_2$ and $x_1$ to zero when calculating $\tilde{y}_1$ and $\tilde{y}_2$, respectively, thereby canceling the mutual impact of the intended streams.

To continue with this example, the demodulator 314 may next estimate each received symbol by using the log-likelihood ratio (LLR) approach. As is known, the LLR approach is a statistical algorithm which, when applied to signal transmissions, yields a probable value of a transmitted symbol from a known dictionary of symbols. In this sense, the probable values of the transmitted symbols may be understood as soft information. In operation, the demodulator 314 may calculate the LLR value for the i-th symbol in the first intended stream $x_1$ by applying the formula $$LLR_{1,I} = \log\left(\sum_{x \in X_{1,I}^{(1)}} \exp\left(\frac{|\tilde{y}_1 - \tilde{h}_{row,1}x|^2}{\sigma_{\tilde{z}_1}^2}\right)\right) - \log\left(\sum_{x \in X_{1,I}^{(0)}} \exp\left(\frac{|\tilde{y}_1 - \tilde{h}_{row,1}x|^2}{\sigma_{\tilde{z}_1}^2}\right)\right),$$

where it $\tilde{h}_{row,r}$ is r-th row of $\tilde{H}$ and $X_{s,I}^{(b)}$ is a set of vectors of signal constellation points whose value in the I-th symbol position of the s-th element is equal to b, and where σ is variance of the noise.

In another embodiment or when operating in a different mode, the smart receiver 300 may directly proceed to calculating LLR values in the demodulator 314 without performing MIMO equalization in the module 310 if the incoming data is non-space-time encoded. In other words, the smart receiver 300 may not generate an equivalent model and may instead use the more computationally complicated model y=Hx+z to calculate maximum-likelihood (ML) LLR values:

$$LLR_{s,I} = \log\left(\sum_{x \in X_{1,I}^{(1)}} \exp\left(\frac{\|y - Hx\|^2}{\sigma_z^2}\right)\right) - \log\left(\sum_{x \in X_{1,I}^{(0)}} \exp\left(\frac{\|y - Hx\|^2}{\sigma_z^2}\right)\right).$$

When calculating LLR values without a prior MIMO equalization, the demodulator 314 or another component of the smart receiver 300 may also simplify the computation based on max-log-map approximation. As another alternative, the smart receiver 300 may reduce the complexity of equalization-free LLR computation by decomposing the matrix H into an orthogonal and a triangular matrix (e.g., by performing the known technique of QR decomposition). If a certain embodiment of the smart receiver 300 relies on QR decomposition, the demodulator 314 may work with Q*y and R rather than with y and H, where * denotes a complex conjugate.

As mentioned above, the intended streams, the interfering streams, or both may also be space-time coded in a MIMO communication system. As is known, space-time MIMO coding frequently relies on the so-called Alamouti approach. To consider the simplest example of this technique, a transmitter may transmit in two timeslots using two antennas according to the coding matrix:

$$C_A = \begin{bmatrix} s_1 & s_2 \\ -s_2^* & s_1^* \end{bmatrix}.$$

Thus, the transmitter may transmit symbols $s_1$ and $s_2$ during the first time slot followed by $-s_2^*$ and $-s_1^*$ the second time slot using the first and the second antenna, respectively.

At the two receive antennas, the operation according to the coding matrix $C_A$ may be modeled as:

$$\begin{bmatrix} y_1[1] \\ y_2[2] \end{bmatrix} = \begin{bmatrix} h_{1,1}[1] & h_{1,2}[1] \\ h_{2,1}[1] & h_{2,2}[1] \end{bmatrix} \begin{bmatrix} x_1 \\ x_2 \end{bmatrix} + \begin{bmatrix} z_1[1] \\ z_2[1] \end{bmatrix},$$

$$\begin{bmatrix} y_1[2] \\ y_2[2] \end{bmatrix} = \begin{bmatrix} h_{1,1}[2] & h_{1,2}[2] \\ h_{2,1}[2] & h_{2,2}[2] \end{bmatrix} \begin{bmatrix} -x_2^* \\ x_1^* \end{bmatrix} + \begin{bmatrix} z_1[2] \\ z_2[2] \end{bmatrix}, \text{ and}$$

-continued $$\begin{bmatrix} y_1[1] \\ y_2[1] \\ y_1^*[2] \\ y_2^*[2] \end{bmatrix} = \begin{bmatrix} h_{1,1}[1] & h_{1,2}[1] \\ h_{2,1}[1] & h_{2,2}[1] \\ h_{1,2}^*[2] & -h_{1,1}^*[2] \\ h_{2,2}^*[2] & -h_{2,1}^*[2] \end{bmatrix} \begin{bmatrix} x_1 \\ x_2 \end{bmatrix} + \begin{bmatrix} z_1[1] \\ z_2[1] \\ z_1^*[2] \\ z_2^*[2] \end{bmatrix}$$

With continued reference to FIG. 3, the smart receiver 300 may model the configuration in which the intended streams are Alamouti-coded but the interfering signals are not Alamouti-coded as:

$$\begin{bmatrix} y_1[1] \\ y_2[2] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \end{bmatrix} \begin{bmatrix} x_1 \\ x_2 \\ x_3[1] \\ x_4[1] \end{bmatrix} + \begin{bmatrix} z_1[1] \\ z_2[1] \end{bmatrix} \text{ and}$$

$$\begin{bmatrix} y_1[2] \\ y_2[2] \end{bmatrix} = \begin{bmatrix} h_{1,1}[2] & h_{1,2}[2] & h_{1,3}[2] & h_{1,4}[2] \\ h_{2,1}[2] & h_{2,2}[2] & h_{2,3}[2] & h_{2,4}[2] \end{bmatrix} \begin{bmatrix} -x_2^* \\ x_1^* \\ x_3[2] \\ x_4[2] \end{bmatrix} + \begin{bmatrix} z_1[2] \\ z_2[2] \end{bmatrix}$$

in the case where $N_r=2$, $N_S=2$, and $N_{TS}=4$.

Thus, the pre-processor for space-time code 310 may perform Alamouti receiver manipulation prior to propagating the received data to the components 312-318. The smart receiver 300 may construct an equivalent receive signal model as $$\tilde{y}=\tilde{H}x+\tilde{z},$$

$$\begin{bmatrix} y_1[1] \\ y_2[1] \\ y_1^*[2] \\ y_2^*[2] \end{bmatrix} = \begin{bmatrix} h_{1,1}[1] & h_{1,2}[1] & h_{1,3}[1] & h_{1,4}[1] & 0 & 0 \\ h_{2,1}[2] & h_{2,2}[2] & h_{2,3}[2] & h_{2,4}[2] & 0 & 0 \\ h_{1,2}^*[2] & -h_{1,1}^*[2] & 0 & 0 & h_{1,3}^*[2] & h_{1,4}^*[2] \\ h_{2,2}^*[2] & -h_{2,1}^*[2] & 0 & 0 & h_{2,3}^*[2] & h_{2,4}^*[2] \end{bmatrix} \begin{bmatrix} x_1 \\ x_2 \\ x_3[1] \\ x_4[1] \\ x_3^*[2] \\ x_4^*[2] \end{bmatrix} + \begin{bmatrix} z_1[1] \\ z_2[1] \\ z_1^*[2] \\ z_2^*[2] \end{bmatrix}$$

Using the model illustrated above and applying the ML approach, the demodulator 314 may calculate the LLR values for the bit I in the stream s according to the formula:

$$LLR_{s,I} = \log\left(\sum_{\tilde{x} \in \tilde{X}_{1,I}^{(1)}} \exp\left(\frac{\|\tilde{y}-\tilde{H}\tilde{x}\|^2}{\sigma_z^2}\right)\right) - \log\left(\sum_{\tilde{x} \in \tilde{X}_{1,I}^{(0)}} \exp\left(\frac{\|\tilde{y}-\tilde{H}\tilde{x}\|^2}{\sigma_z^2}\right)\right),$$

where $\tilde{X}_{s,I}^{(b)}$ is a set of vectors of signal constellation points whose value in the I-th bit position of the s-th element is equal to b, and where σ is variance of the noise. As in the example of decoding non-space-time-coded signals discussed above, the max-log-approximation, or any other suitable approximation technique, may be used as well. It will be noted that optionally, the smart receiver 300 may simplify the LLR computation by using the MIMO equalizer 312 after performing Alamouti receiver manipulation at the module 310 but prior to processing the signals in the module 314.

If, on the other hand, the smart receiver 300 ascertains that the intended streams are not space-time coded but the interfering streams are Alamouti-coded, the smart receiver may model the received signals as:

$$\begin{bmatrix} y_1[1] \\ y_2[1] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \end{bmatrix} \begin{bmatrix} x_1[1] \\ x_2[1] \\ x_3 \\ x_4 \end{bmatrix} + \begin{bmatrix} z_1[1] \\ z_2[1] \end{bmatrix} \text{ and}$$

$$\begin{bmatrix} y_1[2] \\ y_2[2] \end{bmatrix} = \begin{bmatrix} h_{1,1}[2] & h_{1,2}[2] & h_{1,3}[2] & h_{1,4}[2] \\ h_{2,1}[2] & h_{2,2}[2] & h_{2,3}[2] & h_{2,4}[2] \end{bmatrix} \begin{bmatrix} x_1[2] \\ x_2[2] \\ -x_4^* \\ -x_3^* \end{bmatrix} + \begin{bmatrix} z_1[2] \\ z_2[2] \end{bmatrix}$$

in a configuration where $N_r=2$, $N_S=2$, and $N_{TS}=4$. Based on this model, the smart receiver may decode the streams by constructing and applying the equivalent model:

$$\tilde{y}=\tilde{H}x+\tilde{z}$$

$$\begin{bmatrix} y_1[1] \\ y_2[1] \\ y_1^*[2] \\ y_2^*[2] \end{bmatrix} =$$

$$\begin{bmatrix} h_{1,1}[1] & h_{1,2}[1] & 0 & 0 & h_{1,3}[1] & h_{1,3}[1] \\ h_{2,1}[2] & h_{2,2}[2] & 0 & 0 & h_{2,3}[1] & h_{2,4}[2] \\ 0 & 0 & h_{1,1}^*[2] & h_{1,2}^*[2] & h_{1,4}^*[2] & -h_{1,3}^*[2] \\ 0 & 0 & h_{2,1}^*[2] & h_{2,2}^*[2] & h_{2,4}^*[2] & -h_{2,3}^*[2] \end{bmatrix} \begin{bmatrix} x_1[1] \\ x_2[1] \\ x_1^*[2] \\ x_2^*[2] \\ x_3 \\ x_4 \end{bmatrix} + \begin{bmatrix} z_1[1] \\ z_2[1] \\ z_1^*[2] \\ z_2^*[2] \end{bmatrix}$$

and calculating LLR values in a manner similar to the case discussed above with reference to Alamouti-encoded intended streams in the presence of interfering non-Alamouti-encoded streams.

Further, it is possible for both the intended streams and for the interfering streams to be space-time coded and, in particular, to be coded according to the Alamouti algorithm. In this case, the signals arriving at the receive antennas 302-308 may be modeled as:

$$\begin{bmatrix} y_1[1] \\ y_2[1] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \end{bmatrix} \begin{bmatrix} x_1 \\ x_2 \\ x_3 \\ x_4 \end{bmatrix} + \begin{bmatrix} z_1[1] \\ z_2[1] \end{bmatrix} \text{ and}$$

$$\begin{bmatrix} y_1[2] \\ y_2[2] \end{bmatrix} = \begin{bmatrix} h_{1,1}[2] & h_{1,2}[2] & h_{1,3}[2] & h_{1,4}[2] \\ h_{2,1}[2] & h_{2,2}[2] & h_{2,3}[2] & h_{2,4}[2] \end{bmatrix} \begin{bmatrix} -x_2^* \\ x_1^* \\ -x_4^* \\ -x_3^* \end{bmatrix} + \begin{bmatrix} z_1[2] \\ z_2[2] \end{bmatrix}.$$

The pre-processor for space-time code 310 may accordingly perform Alamouti manipulation according to the equivalent model:

$$\begin{bmatrix} y_1[1] \\ y_2[1] \\ y_1^*[2] \\ y_2^*[2] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \\ h_{1,2}^*[2] & -h_{1,1}^*[2] & h_{1,4}^*[2] & -h_{1,3}^*[2] \\ h_{2,2}^*[2] & -h_{2,1}^*[2] & h_{2,4}^*[2] & -h_{2,3}^*[2] \end{bmatrix} \begin{bmatrix} x_1 \\ x_2 \\ x_3 \\ x_4 \end{bmatrix} + \begin{bmatrix} z_1[1] \\ z_2[1] \\ z_1^*[2] \\ z_2^*[2] \end{bmatrix}.$$

It will be appreciated that Alamouti coding is discussed herein by way of example only and that the smart receiver 300 may similarly process other forms of space-time encoding. In general, the pre-processor for space-time code 310 may manipulate the received signals as necessary to represent these received signals in terms of the original transmit symbols. Thus, the smart receiver 300 may use the technique of modeling the intended and interference signals, as well as generating and applying an equivalence model as discussed above, to other types of linearly processed signals.

As illustrated in FIG. 3, the demodulated signals generated by the decoder 318 may be directed to a consuming component or application (not shown). With respect to the components 316 and 318, one of ordinary skill in the art will appreciate that because the one or more transmitters transmit data in particular timeslots according to a particular transmission logic (e.g., transmitting the sequence $s_1 s_2$ simultaneously from two antennas), the order of the received symbols must be restored at the receiving end. Further, the decoder 318 may map the resulting symbols to the corresponding bits according to a scheme which may be particular to the network or to the protocol that is utilized.

FIGS. 4-8 are flow diagrams of several example methods for performing MIMO decoding in the presence of various interfering sources. In some embodiments, each of the methods of FIGS. 4-8 may be the sole mode of operation of a corresponding smart receiver 300. In other embodiments, a smart receiver 300 may implement several or all of the methods of FIGS. 4-8 and may include additional logic for selecting between the methods in view of the MIMO mode of the intended streams (e.g., space-time encoded, non-space-time encoded, etc.), the MIMO mode of the intended streams, computational capability (e.g., sufficient processing power to perform ML computation), equalizer preferences (e.g., ZF, MMSE, etc.), and other user- or network-configurable factors. Thus, each of the methods illustrated in FIGS. 4-8 may refer to separate embodiments or to a particular mode of a certain single embodiment. For ease of explanation and clarity, these diagrams do not include some of the common steps such as de-interleaving and decoding of the stream upon LLR calculation.

Figure 4:
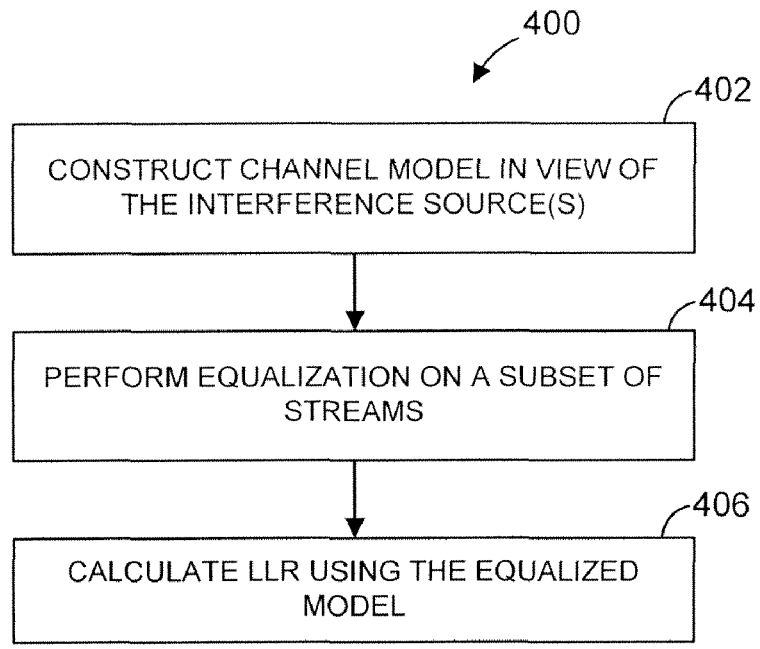
FIG. 4 is an exemplary flowchart of an algorithm for decoding non-space-time-coded signals using equalization, implemented by a receiver consistent with FIG. 3.

Referring specifically to FIG. 4, an example method 400 for decoding non-space-time-coded signals using equalization may begin in a block 402, in which the smart receiver 300 constructs a communication system and channel model as discussed above with reference to FIG. 3. In particular, the smart receiver 300 may obtain channel information including modulation, gain, and MIMO mode parameters in a wireless and/or wired manner to define a channel equivalent matrix, a noise correlation matrix, and the receive and transmit signal vectors. Next, in a block 404, the method 400 may equalize a subset of the streams to simplify the subsequent calculation of the probable intended symbols. For example, using the zero-forcing technique, the smart receiver 300 executing the method 400 may define an equivalent channel model according to which an intended stream at a certain receive antenna can be seen as unaffected by an intended stream transmitted to another receive antenna. More generally, the method 400 may apply at this stage one or more of several equalization techniques such as those known in the art, for example.

Finally, in a block 406, the smart receiver 300 may calculate the value of each received symbol by applying a suitable statistical approach. As discussed above, each signal from a transmit antenna may undergo significant fading due to the distance of propagation, reflection off obstacles in the propagation path, interference due to other transmitters, etc. and each of these factors may prevent the smart receiver 300 from precisely knowing the value of each received symbol. However, by including the parameters related to the interfering channels in the channel model, the smart receiver 300 may have a significantly better quality of information about the probable transmitted symbols. Accordingly, when the receiver 300 applies LLR or another statistical methodology to the received data in view of such factors as noise variance, the dictionary of possible symbols, previously received data, etc., the probability of properly restoring the intended symbol is significantly increased.

Figure 5:
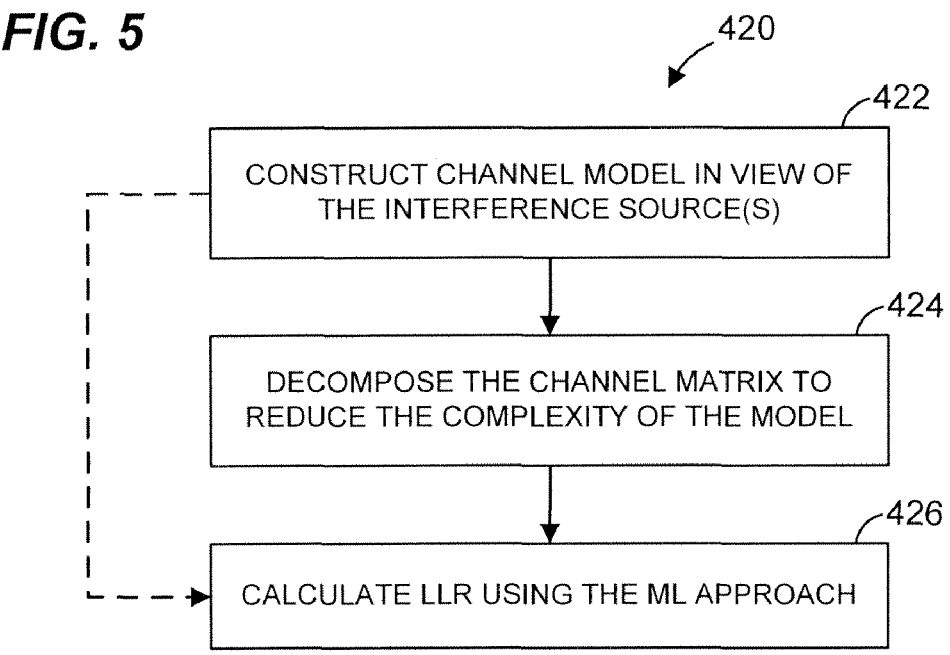
FIG. 5 is an exemplary flowchart of an algorithm for decoding non-space-time-coded signals with no equalization, implemented by a receiver consistent with FIG. 3.

Referring to FIG. 5, an example method 420 for decoding non-space-time-coded signals with no equalization is similar to the method 400, except that the method 420 does not include channel equalizing. Instead, the method 420 decomposes the matrix corresponding to the channel which includes both the intended and interfering symbols using QR decomposition, for example. Alternatively, the method 420 may skip the act of approximating the channel matrix and proceed directly to a block 426, in which the smart receiver 300 calculates LLR values using the ML approach. As indicated above, the ML approach may yield a more accurate value at the expense of higher computational complexity. It is therefore contemplated that in some embodiments, the method 400 may be preferable to accelerate the decoding of the incoming data whereas in other embodiments, the smart receiver 300 may use a powerful processor to efficiently support ML computation.

Figure 6:
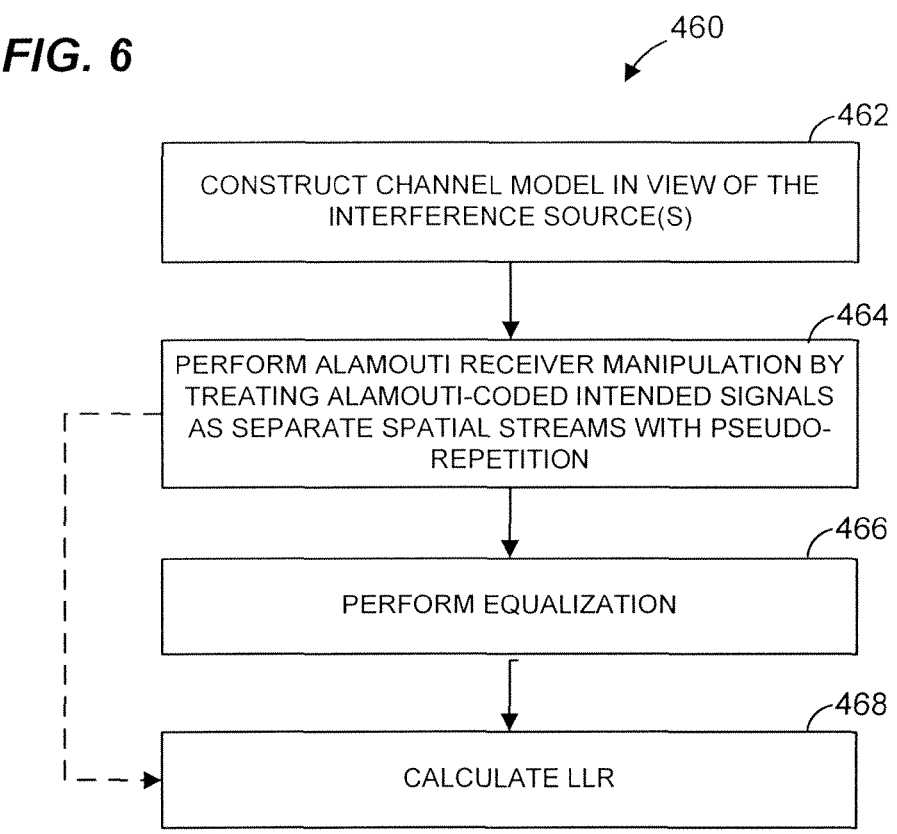
FIG. 6 is an exemplary flowchart of an algorithm for decoding Alamouti-coded intended signals, implemented by a receiver consistent with FIG. 3.

With respect to FIG. 6, an example method 460 for decoding Alamouti-coded intended signals may similarly begin in a block 462 where the smart receiver may construct a model in view of the particular space-time encoding technique. In the particular case illustrated in FIG. 6, the transmitters encode the intended signals according to the Alamouti formula. Thus, in a block 464, the smart receiver 300 may perform the appropriate space-time receiver manipulation to prepare the received data for (optional) equalization in a block 466 and demodulation in a block 468. In particular, the smart receiver 300 may treat the Alamouti-coded intended signals as separate spatial streams with pseudo-repetition.

Figure 7:
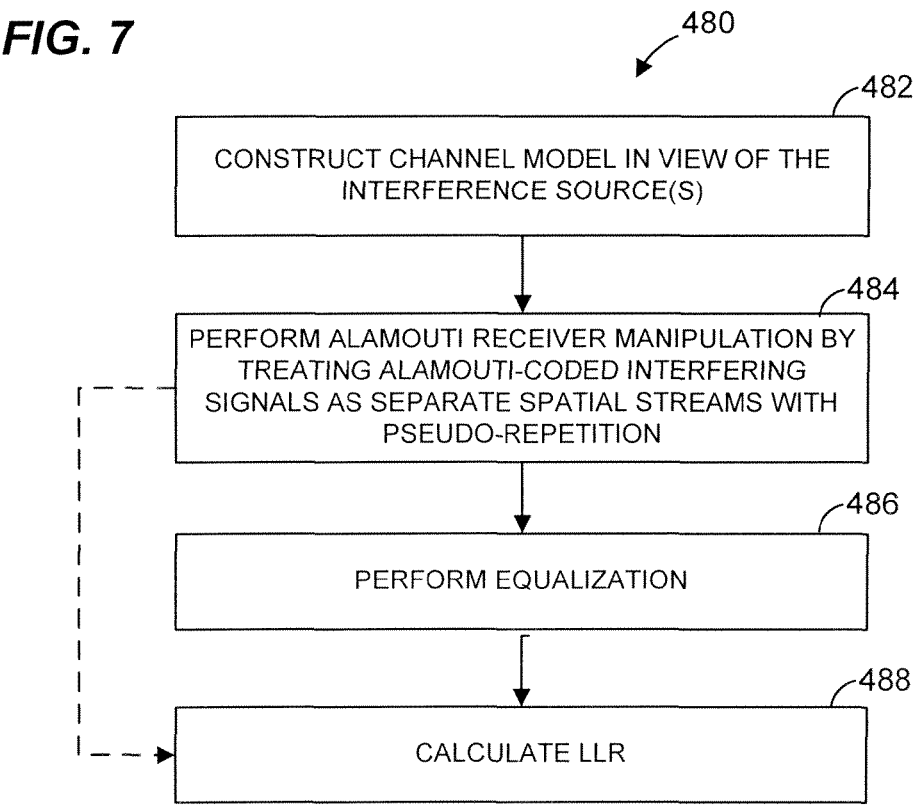
FIG. 7 is an exemplary flowchart of an algorithm for decoding signals in the presence of Alamouti-coded interfering signals, implemented by a receiver consistent with FIG. 3.

In an example method 480 illustrated in FIG. 7, decoding may be applied to Alamouti-coded interfering signals in a channel where the intended signals are not Alamouti-coded. The method 480 is similar to the method 460. However, in blocks 482 and 484, the smart receiver 300 may construct a transmission model and manipulate the model in view of the difference in the encoding of the intended and interfering streams.

Figure 8:
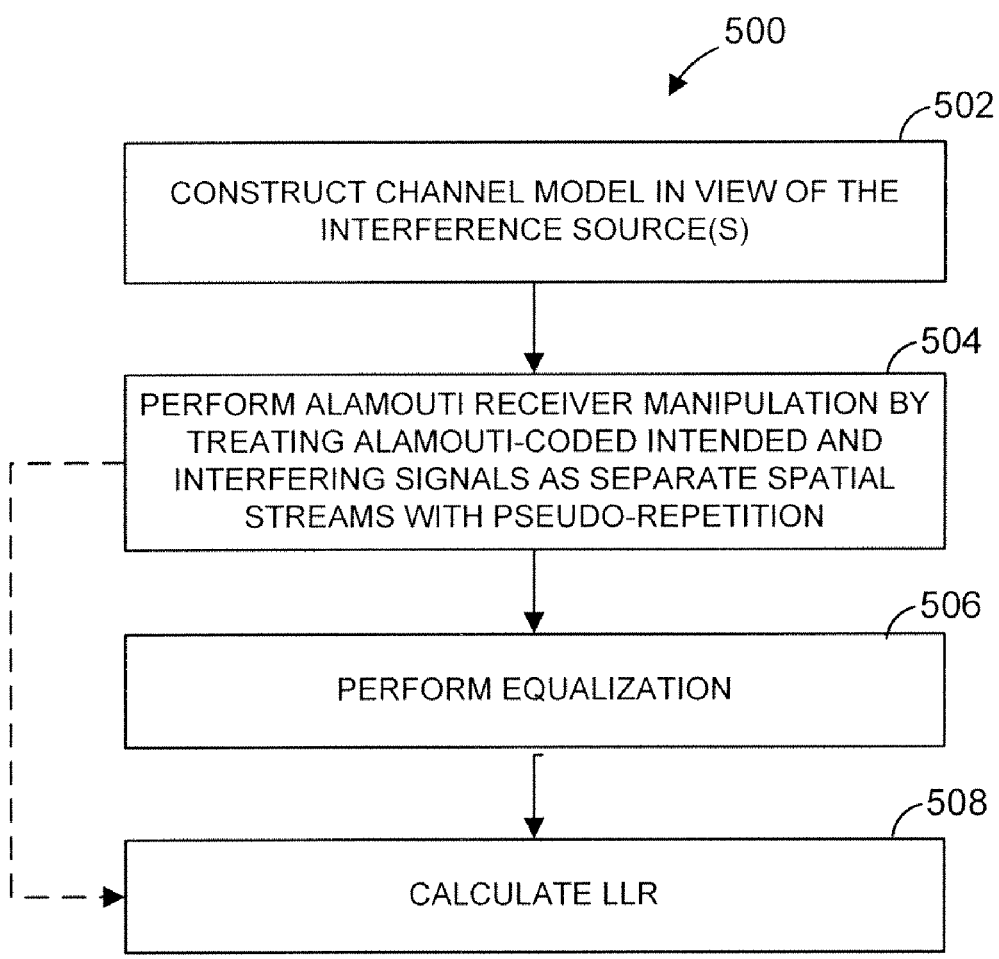
FIG. 8 is an exemplary flowchart of an algorithm for decoding Alamouti-coded intended signals in the presence of Alamouti-coded intended and interfering signals, implemented by a receiver consistent with FIG. 3.

Finally, FIG. 8 illustrates an example method 500 for decoding signals when both the intended and the interfering signals are Alamouti-coded. The method 500 differs from the methods 460 and 480 primarily in the construction of the channel model and in receiver manipulation in blocks 502 and 504, respectively.

Methods of decoding signals in the presence of interference sources such as those described above may be utilized in various MIMO devices. For example, techniques such as described above may be utilized in base stations, access points, wireless routers, etc. Additionally, FIGS. 9A-9F illustrate various devices in which signal decoding techniques such as described above, may be employed.

Figure 9A:
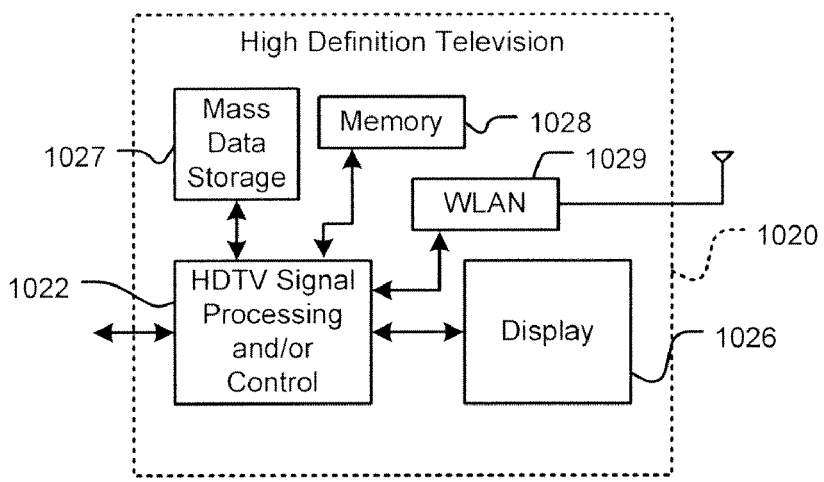
FIG. 9A is a block diagram of a high definition television that may utilize a method and system for decoding MIMO signals in the presence of various interference sources such as described herein.

Referring now to FIG. 9A, such techniques may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required. The signal processing and/or control circuit 1022 may implement signal decoding techniques such as described above.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement signal decoding techniques such as described above.

Figure 9B:
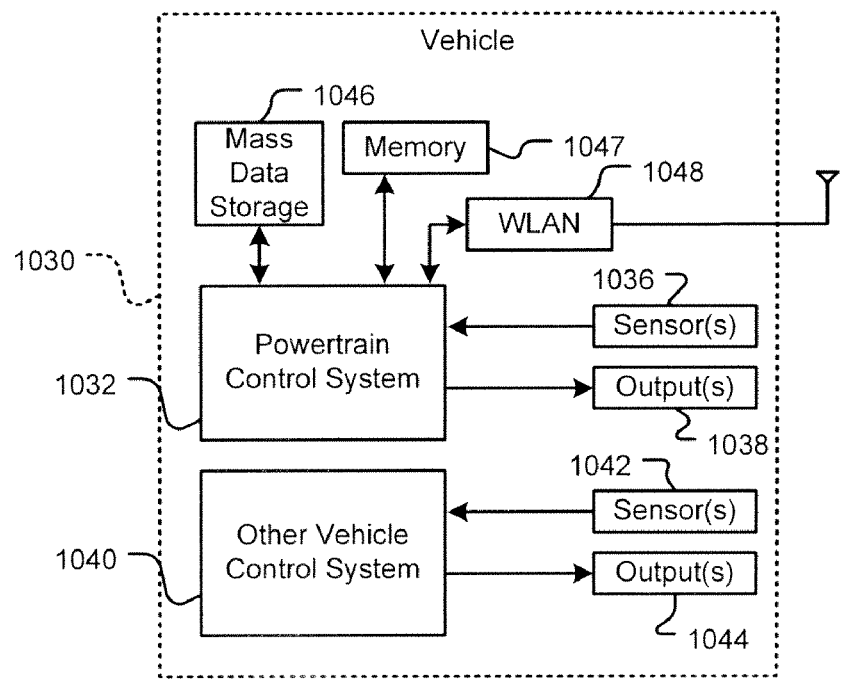
FIG. 9B is a block diagram of a vehicle that may utilize a method and system for decoding MIMO signals in the presence of various interference sources such as described herein.

Referring now to FIG. 9B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement signal decoding techniques such as described above.

Figure 9C:
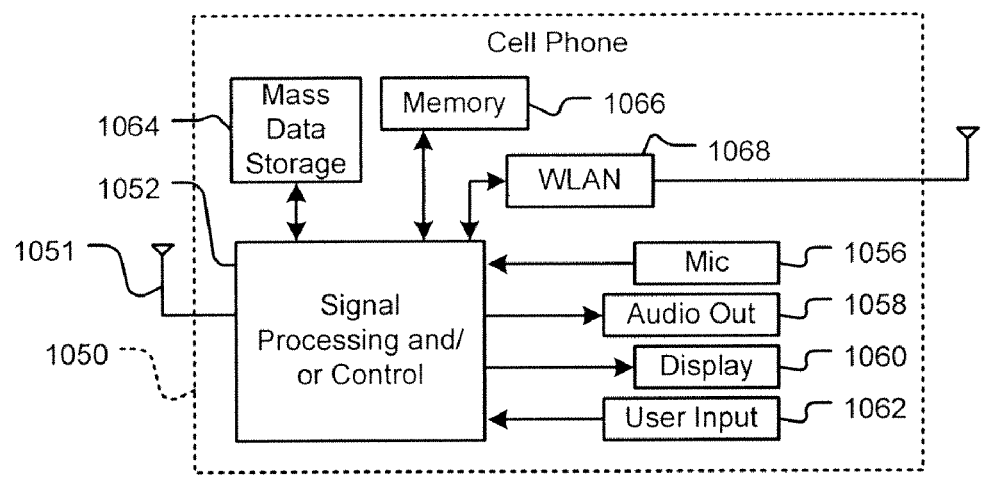
FIG. 9C is a block diagram of a cell phone that may utilize a method and system for decoding MIMO signals in the presence of various interference sources such as described herein.

Referring now to FIG. 9C, such techniques may be used in a cellular phone 1050 that may include a cellular antenna 1051. The cellular phone 1050 may include either or both signal processing and/or control circuits, which are generally identified in FIG. 9C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions. The signal processing and/or control circuits 1052 may implement signal decoding techniques such as described above.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068. The WLAN network interface 1068 may implement MCS selection techniques such as described above.

Figure 9D:
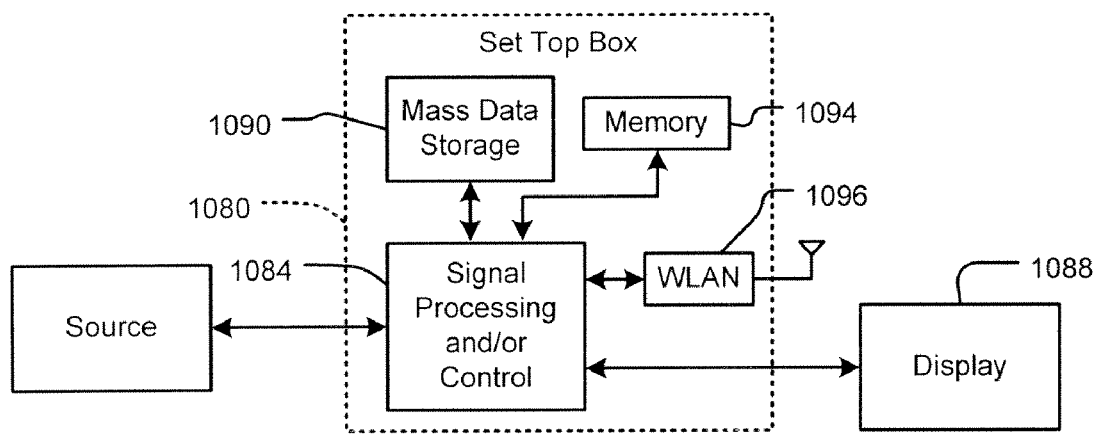
FIG. 9D is a block diagram of a set top box that may utilize a method and system for decoding MIMO signals in the presence of various interference sources such as described herein.

Referring now to FIG. 9D, such techniques may be utilized in a set top box 1080. The set top box 1080 may include either or both signal processing and/or control circuits, which are generally identified in FIG. 9D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function. The signal processing and/or control circuits 1084 may implement signal decoding techniques such as described above.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The WLAN network interface 1096 may implement MCS selection techniques such as described above.

Figure 9E:
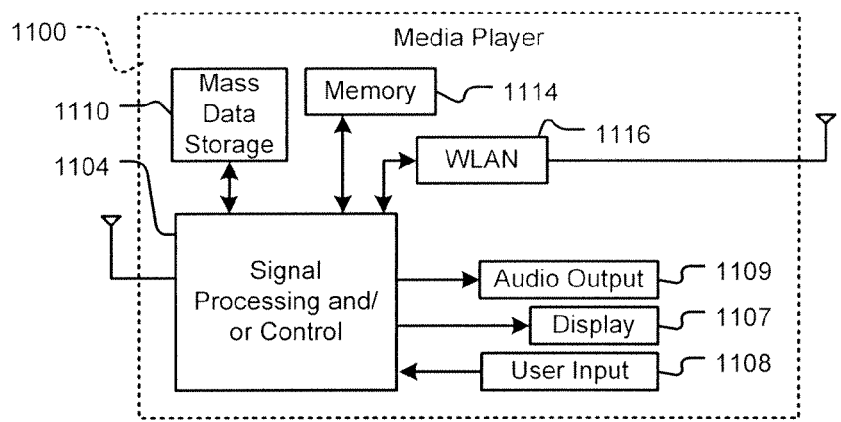
FIG. 9E is a block diagram of a media player that may utilize a method and system for decoding MIMO signals in the presence of various interference sources such as described herein.

Referring now to FIG. 9E, such techniques may be used in a media player 1100. The media player 1100 may include either or both signal processing and/or control circuits, which are generally identified in FIG. 9E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement signal decoding techniques such as described above.

Figure 9F:
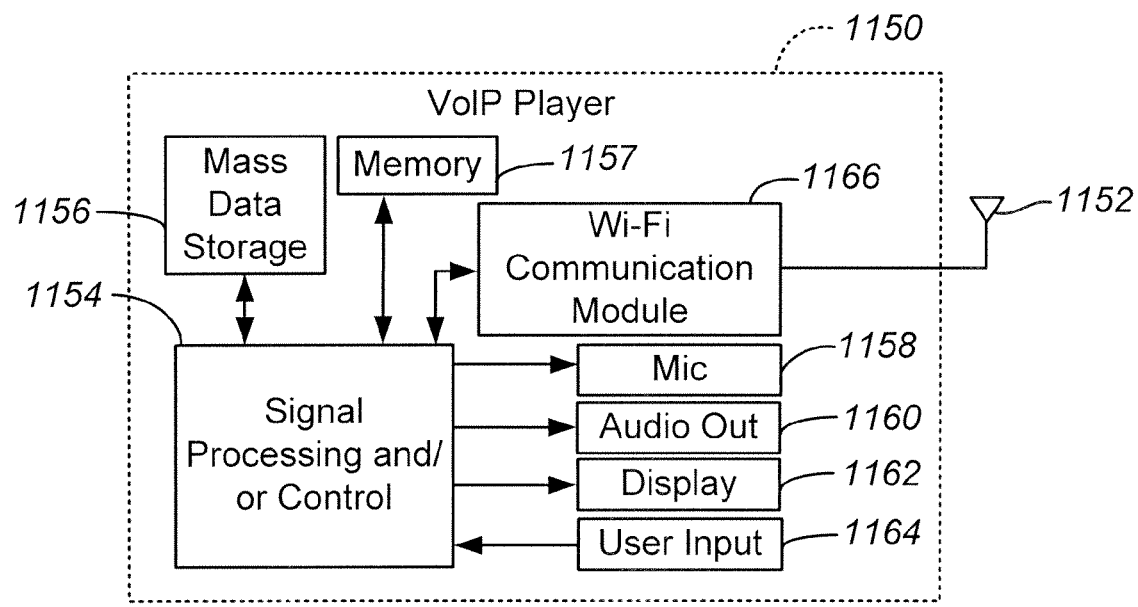
FIG. 9F is a block diagram of a voice-over-IP (VoIP) player that may utilize a method and system for decoding MIMO signals in the presence of various interference sources such as described herein.

Referring to FIG. 9F, such techniques may be utilized in a Voice over Internet Protocol (VoIP) phone 1150 that may include an antenna 1152. The VoIP phone 1150 may include either or both signal processing and/or control circuits, which are generally identified in FIG. 9F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perforin other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166. The WiFi communication module 1166 may implement signal decoding techniques such as described above.

At least some of the various blocks, operations, and techniques described above may be implemented in hardware, firinware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method of processing a signal transmitted via a multiple input multiple output (MIMO) communication channel, the method comprising:
   obtaining a first set of parameters associated with a first plurality of transmitters transmitting a plurality of intended streams, wherein the first set of parameters includes modulation information corresponding to the plurality of intended streams;
   obtaining a second set of parameters associated with an interference source, wherein the second set of parameters includes modulation information corresponding to the interference source;
   receiving a plurality of streams including the plurality of intended streams;
   pre-processing the plurality of streams to generate an equivalent receive signal model if one or more of the received plurality of streams are space-time-coded;
   demodulating the plurality of streams using the respective modulation information corresponding to the plurality of intended streams and to the interference source, wherein the interference source includes a plurality of interfering streams; and
   decoding the plurality of intended streams.

2. The method of claim 1, wherein receiving a plurality of streams includes receiving the plurality of streams at a plurality of antennas; and wherein
   demodulating the plurality of streams further includes using a plurality of noise parameters, wherein each of the plurality of noise parameters corresponds to a respective one of the plurality of antennas.

3. The method of claim 1, wherein the interference source includes a second plurality of transmitters; wherein the first plurality of transmitters and the second plurality of transmitters are associated with respective cells of a cellular communication network.

4. The method of claim 3, wherein the cellular communication network is compliant with the Institute for Electrical and Electronics Engineers (IEEE) 802.16 Standard.

5. The method of claim 1, wherein the first plurality of transmitters are antennas associated with a first base station, wherein the interference source includes a plurality of antennas associated with a second base station, wherein the intended streams are downlink streams from the first base station to a mobile station; and wherein
   obtaining the second set of parameters associated with the interference source includes processing channel data associated with the second base station.

6. The method of claim 5, wherein processing the channel data associated with the second base station includes processing a downlink map (DL-MAP) message.

7. The method of claim 5, wherein processing the channel data associated with the second base station includes processing a pseudo-noise (PN) sequence transmitted at a pilot subcarrier from the second base station.

8. The method of claim 5, further comprising obtaining a third set of parameters including processing channel data associated with a third base station; and wherein
   demodulating the plurality of streams further includes using the third set of parameters.

9. The method of claim 1, wherein the first plurality of transmitters are associated with at least a first mobile station, wherein the interference source is associated with at least a second mobile station, and wherein the intended streams are uplink streams from the first mobile station to a first base station; and wherein
   obtaining the second set of parameters associated with the interference source includes processing channel data associated with at least a second base station adjacent to the first base station.

10. The method of claim 9, wherein obtaining the second set of parameters includes receiving the second set of parameters via a backbone network to which the first base station and the second base station are communicatively coupled.

11. The method of claim 1, wherein obtaining the second set of parameters includes obtaining at least one of a modulation scheme, channel gain information, or a MIMO mode associated with the interference source.

12. The method of claim 1, wherein demodulating the plurality of streams includes calculating a log-likelihood ratio (LLR) for each symbol in the plurality of intended streams according to a maximum-likelihood (ML) scheme.

13. The method of claim 12, wherein calculating the log-likelihood ratio (LLR) includes performing QR decomposition of a channel matrix corresponding to a channel including the plurality of intended streams and the interfering streams.

14. The method of claim 1, wherein processing the signal further includes equalizing a subset of streams within the plurality of streams prior to LLR calculation; and wherein demodulating the plurality of streams includes calculating a log-likelihood ratio (LLR) for each symbol in the plurality of intended streams.

15. The method of claim 1, wherein the plurality of intended streams are space-time-coded according to an Alamouti coding scheme.

16. The method of claim 1, wherein the plurality of streams includes the plurality of interfering streams; and wherein processing the signal further includes:
   equalizing a subset of the plurality of streams;
   wherein
      none of the received plurality of streams is space-time-coded.

17. The method of claim 16, wherein equalizing a subset of the plurality of streams includes applying at least one of zero-forcing (ZF), minimum mean square error (MMSE), ZF decision feedback equalization (DFE), or MMSE DFE techniques.

18. The method of claim 1, wherein the plurality of streams includes the plurality of interfering streams; wherein none of the received plurality of streams is space-time-coded; and wherein demodulating the plurality of streams includes calculating LLR for each symbol in the plurality of intended streams according to a maximum-likelihood (ML) scheme.

19. A method of processing a signal transmitted via a multiple input multiple output (MIMO) communication channel, the method comprising:
   obtaining a first set of parameters associated with a first plurality of transmitters transmitting a plurality of intended streams;
   obtaining a second set of parameters associated with an interference source;
   receiving a plurality of streams including the plurality of intended streams, wherein receiving a plurality of streams includes receiving each of the plurality of streams at a respective one of a plurality of receive antennas; and
   demodulating the plurality of intended streams using the first set of parameters and the second set of parameters, wherein demodulating the plurality of intended streams includes applying a model:

$$y = Hx + z,$$

$$y = \begin{bmatrix} y_1 \\ y_2 \\ \vdots \\ y_{N_R} \end{bmatrix} \quad H = \begin{bmatrix} h_{1,1} & h_{1,2} & \cdots & h_{1,N_{TS}} \\ h_{2,1} & h_{2,2} & \cdots & h_{2,N_{TS}} \\ \vdots & \vdots & \vdots & \vdots \\ h_{N_R,1} & h_{N_R,2} & \cdots & h_{N_R,N_{TS}} \end{bmatrix} \quad x = \begin{bmatrix} x_1 \\ x_2 \\ \vdots \\ x_{N_{TS}} \end{bmatrix}$$

$$z = \begin{bmatrix} z_1 \\ z_2 \\ \vdots \\ z_{N_R} \end{bmatrix};$$

wherein
   $N_R$ is a number of receive antennas;
   $N_{TS}$ is a number of streams in the plurality of streams;
   $y_r$ is a signal received at a receiver r, wherein each receiver r is included in the plurality of receivers;
   $x_s$ is one of the plurality of intended streams for $1 \leq s \leq N_S$ and one of a plurality of interfering streams associated with the interference source for $N_{S+1} \leq s \leq N_{TS}$; and
   $h_{r,s}$ is a channel gain associated with the stream $x_s$ and corresponding to the receiver r; and
   wherein at least one of i) the plurality of intended streams is Alamouti-coded, or ii) the plurality of interfering streams is Alamouti-coded.

20. The method of claim 19, wherein the plurality of streams includes the plurality of interfering streams associated with the interference source; and wherein demodulating the plurality of intended streams includes utilizing a channel equivalence model:

$$\begin{bmatrix} y_1[1] \\ y_2[1] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \end{bmatrix} \begin{bmatrix} x_1 \\ x_2 \\ x_3[1] \\ x_4[1] \end{bmatrix} + \begin{bmatrix} z_1[1] \\ z_2[1] \end{bmatrix} \text{ and}$$

$$\begin{bmatrix} y_1[2] \\ y_2[2] \end{bmatrix} = \begin{bmatrix} h_{1,1}[2] & h_{1,2}[2] & h_{1,3}[2] & h_{1,4}[2] \\ h_{2,1}[2] & h_{2,2}[2] & h_{2,3}[2] & h_{2,4}[2] \end{bmatrix} \begin{bmatrix} -x_2^* \\ x_1^* \\ x_3[2] \\ x_4[2] \end{bmatrix} + \begin{bmatrix} z_1[2] \\ z_2[2] \end{bmatrix};$$

wherein the plurality of intended streams is Alamouti-coded and the plurality of interfering streams is not Alamouti-coded.

21. The method of claim 19, wherein the plurality of streams includes the plurality of interfering streams associated with the interference source; and wherein demodulating the plurality of intended streams includes utilizing a channel equivalence model:

$$\begin{bmatrix} y_1[1] \\ y_2[1] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \end{bmatrix} \begin{bmatrix} x_1[1] \\ x_2[1] \\ x_3 \\ x_4 \end{bmatrix} + \begin{bmatrix} z_1[1] \\ z_2[1] \end{bmatrix} \text{ and}$$

$$\begin{bmatrix} y_1[2] \\ y_2[2] \end{bmatrix} = \begin{bmatrix} h_{1,1}[2] & h_{1,2}[2] & h_{1,3}[2] & h_{1,4}[2] \\ h_{2,1}[2] & h_{2,2}[2] & h_{2,3}[2] & h_{2,4}[2] \end{bmatrix} \begin{bmatrix} x_1[2] \\ x_2[2] \\ -x_4^* \\ -x_3^* \end{bmatrix} + \begin{bmatrix} z_1[2] \\ z_2[2] \end{bmatrix}$$

wherein the plurality of intended streams is not Alamouti-coded and the plurality of interfering streams is Alamouti-coded.

22. The method of claim 19, wherein the plurality of streams includes the plurality of interfering streams associated with the interference source; and wherein demodulating the plurality of intended streams includes utilizing a channel equivalence model:

$$\begin{bmatrix} y_1[1] \\ y_2[1] \\ y_1^*[2] \\ y_2^*[2] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \\ h_{1,2}^*[2] & -h_{1,1}^*[2] & h_{1,4}^*[2] & -h_{1,3}^*[2] \\ h_{2,2}^*[2] & -h_{2,1}^*[2] & h_{2,4}^*[2] & -h_{2,3}^*[2] \end{bmatrix} \begin{bmatrix} x_1 \\ x_2 \\ x_3 \\ x_4 \end{bmatrix} + \begin{bmatrix} z_1[1] \\ z_2[1] \\ z_1^*[2] \\ z_2^*[2] \end{bmatrix}.$$

wherein the plurality of intended streams is Alamouti-coded and the plurality of interfering streams is Alamouti-coded.

23. A smart receiver for processing a signal transmitted via a multiple input multiple output (MIMO) communication channel, comprising:
a plurality of antennas which receive a plurality of streams including a set of intended streams and a set of interference streams via the MIMO channel;
a demodulator that demodulates the plurality of streams using at least first channel data associated with the set of intended streams and second channel data associated with the set of interference streams, wherein the demodulator demodulates the plurality of streams at least in part by applying a model:

$y=Hx+z$, $$y = \begin{bmatrix} y_1 \\ y_2 \\ \vdots \\ y_{N_R} \end{bmatrix} \quad H = \begin{bmatrix} h_{1,1} & h_{1,2} & \cdots & h_{1,N_{TS}} \\ h_{2,1} & h_{2,2} & \cdots & h_{2,N_{TS}} \\ \vdots & \vdots & \vdots & \vdots \\ h_{N_R,1} & h_{N_R,2} & \cdots & h_{N_R,N_{TS}} \end{bmatrix} \quad x = \begin{bmatrix} x_1 \\ x_2 \\ \vdots \\ x_{N_{TS}} \end{bmatrix}$$

$$z = \begin{bmatrix} z_1 \\ z_2 \\ \vdots \\ z_{N_R} \end{bmatrix};$$

wherein
$N_R$ is a number of receive antennas;
$N_{TS}$ is a number of streams in the plurality of streams;
$y_r$ is a signal received at a receiver r, wherein each receiver r is included in the plurality of receivers;
$x_s$ is one stream of the set of intended streams for $1 \leq s \leq N_S$ and one stream of the set of interference streams for $N_{S+1} \leq s \leq N_{TS}$; and
$h_{r,s}$ is a channel gain associated with the stream $x_s$ and corresponding to the receiver r; and
wherein at least one of i) the set of intended streams is Alamouti-coded, or the set of interfering streams is Alamouti-coded;
a deinterleaver that receives the demodulated plurality of streams and restores a sequence of symbols; and
a decoder that decodes the restored sequence of symbols.

24. The smart receiver of claim 23, further comprising a pre-processor that processes space-time encoding of at least a subset of the plurality of streams.

25. The smart receiver of claim 24, wherein the pre-processor processes Alamouti-encoded signals.

26. The smart receiver of claim 23, further comprising an equalizer that equalizes a subset of the plurality of streams.

27. A base station incorporating the smart receiver of claim 23, wherein the smart receiver further comprises a wired network connection to obtain channel data from at least one other base station.

28. A method of processing, at a first wireless device, a signal including a plurality of streams from a second wireless device communicating in a MIMO mode with the first wireless device, the method comprising:
receiving a first channel description associated with a first cell in which the first wireless device and the second wireless device operate, wherein receiving the first channel description includes receiving modulation information corresponding to the first cell;
receiving a second channel description associated with a second cell, wherein receiving the second channel description includes receiving modulation information corresponding to the second cell;
receiving the signal, wherein the signal includes i) a plurality of intended streams transmitted from the second wireless device via a plurality of transmitters and ii) a plurality of interference streams;
pre-processing the signal to generate an equivalent receive signal model if one or more of the received plurality of streams are space-time-coded;
demodulating the signal using the modulation information corresponding to the first cell and the modulation information corresponding to the second cell;
determining LLR values using the equivalent receive signal model; and
decoding the signal using the determined LLR values.

29. The method of claim 28, wherein the first wireless device is one of a mobile station or a base station and wherein the second wireless device is the other one of the mobile station or the base station.

30. The method of claim 28, wherein receiving the first channel description includes receiving a first downlink map (DL-MAP) message specifying resource allocation in the first cell associated with a network compliant with the Institute for Electrical and Electronics Engineers (IEEE) 802.16 Standard, and wherein receiving the second channel description includes receiving a second DL-MAP message specifying resource allocation in the second cell associated with the network.

31. The method of claim 28, wherein generating the equivalent receive signal model includes estimating channel gain associated with each of the plurality of intended streams and each of the plurality of interference streams.

32. The method of claim 28, wherein generating the equivalent receive signal model includes obtaining at least one of a MIMO mode, channel gain information, and modulation information associated with the second cell.

33. The smart receiver of claim 23, wherein the demodulator demodulates the plurality of streams at least in part by utilizing a channel equivalence model:

$$\begin{bmatrix} y_1[1] \\ y_2[1] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \end{bmatrix} \begin{bmatrix} x_1 \\ x_2 \\ x_3[1] \\ x_4[1] \end{bmatrix} + \begin{bmatrix} z_1[1] \\ z_2[1] \end{bmatrix} \text{ and}$$

$$\begin{bmatrix} y_1[2] \\ y_2[2] \end{bmatrix} = \begin{bmatrix} h_{1,1}[2] & h_{1,2}[2] & h_{1,3}[2] & h_{1,4}[2] \\ h_{2,1}[2] & h_{2,2}[2] & h_{2,3}[2] & h_{2,4}[2] \end{bmatrix} \begin{bmatrix} -x_2^* \\ x_1^* \\ x_3[2] \\ x_4[2] \end{bmatrix} + \begin{bmatrix} z_1[2] \\ z_2[2] \end{bmatrix};$$

wherein the set of intended streams is Alamouti-coded and the set of interfering streams is not Alamouti-coded.

34. The smart receiver of claim 23, wherein the demodulator demodulates the plurality of streams at least in part by utilizing a channel equivalence model:

$$\begin{bmatrix} y_1[1] \\ y_2[1] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \end{bmatrix} \begin{bmatrix} x_1[1] \\ x_2[1] \\ x_3 \\ x_4 \end{bmatrix} + \begin{bmatrix} z_1[1] \\ z_2[1] \end{bmatrix} \text{ and}$$

$$\begin{bmatrix} y_1[2] \\ y_2[2] \end{bmatrix} = \begin{bmatrix} h_{1,1}[2] & h_{1,2}[2] & h_{1,3}[2] & h_{1,4}[2] \\ h_{2,1}[2] & h_{2,2}[2] & h_{2,3}[2] & h_{2,4}[2] \end{bmatrix} \begin{bmatrix} x_1[2] \\ x_2[2] \\ -x_4^* \\ -x_3^* \end{bmatrix} + \begin{bmatrix} z_1[2] \\ z_2[2] \end{bmatrix}$$

wherein the set of intended streams is not Alamouti-coded and the set of interfering streams is Alamouti-coded.

35. The smart receiver of claim 23, wherein the demodulator demodulates the plurality of streams at least in part by utilizing a channel equivalence model:

$$\begin{bmatrix} y_1[1] \\ y_2[1] \\ y_1^*[2] \\ y_2^*[2] \end{bmatrix} = \begin{bmatrix} h_{1,1}[1] & h_{1,2}[1] & h_{1,3}[1] & h_{1,4}[1] \\ h_{2,1}[1] & h_{2,2}[1] & h_{2,3}[1] & h_{2,4}[1] \\ h_{1,2}^*[2] & -h_{1,1}^*[2] & h_{1,4}^*[2] & -h_{1,3}^*[2] \\ h_{2,2}^*[2] & -h_{2,1}^*[2] & h_{2,4}^*[2] & -h_{2,3}^*[2] \end{bmatrix} \begin{bmatrix} x_1 \\ x_2 \\ x_3 \\ x_4 \end{bmatrix} + \begin{bmatrix} z_1[1] \\ z_2[1] \\ z_1^*[2] \\ z_2^*[2] \end{bmatrix}$$

wherein the set of intended streams is Alamouti-coded and the set of interfering streams is Alamouti-coded.

* * * * *